May 25, 1937.  C. H. WOLCOTT  2,081,569

CLUTCH CONTROL MECHANISM

Filed Feb. 12, 1932

INVENTOR.
CARL H. WOLCOTT
BY H. O. Clayton
ATTORNEY

Patented May 25, 1937

2,081,569

UNITED STATES PATENT OFFICE 2,081,569

CLUTCH CONTROL MECHANISM

Carl H. Wolcott, South Bend, Ind., assignor to Bendix Aviation Corporation, South Bend, Ind., a corporation of Delaware Application February 12, 1932, Serial No. 592,613

10 Claims. (Cl. 192—.01)

This invention relates in general to vacuum operated power means for operating the clutch mechanism of an automotive vehicle and in particular to a valve structure for controlling the operation of the motor unit of the power means.

It is the principal object of the invention to improve upon the power operated clutch control mechanism disclosed in the patent to Ross I. Belcia, No. 1,470,272, dated October 9, 1923. This patent discloses an accelerator operated three-way control valve operable to either energize or deenergize a vacuum operated motor to effect, respectively, a disengagement or an engagement of the automotive clutch. The patented structure, however, fails to provide means for so controlling the engagement of the clutch as to simulate the corresponding manual operation thereof, and the patent also fails to provide means for cutting out, at will, the operation of the power mechanism.

The present invention is, therefore, specifically directed to a valve structure which retains all of the attributes of the valve of the patented structure and in addition provides means for more effectively controlling the operation of the clutch motor.

To the above end there is suggested a valve structure comprising a one-piece casing member and a plurality of manually operable telescoping valve members movable within the casing relative thereto and relative to each other.

It is an object of the invention to effect, by the above suggested valve structure, the three necessary bleed, cut off and three-way valvular control functions in the control of a fluid pressure clutch operating mechanism of the type described in the aforementioned patent.

Other objects and advantages of the invention and desirable details of construction will be apparent to those skilled in the art from the following description, taken in connection with the accompanying drawing, in which.

Figure 1:
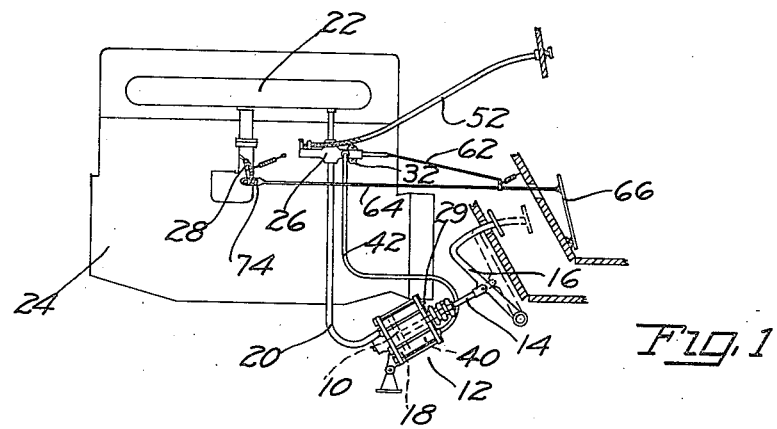
Figure 1 is a diagrammatic view of a vacuum operated clutch control mechanism embodying my invention.

There are disclosed, diagrammatically in Figure 1, the essential elements of an engine operated vacuum clutch control mechanism similar in general operation to that disclosed in the aforementioned patent. The piston 10 of a double-ended vacuum operated motor 12 is connected, by a rod 14, slotted at 15, with a conventional clutch pedal 16. The motor is adapted to be energized and deenergized to operate the clutch by alternately evacuating and venting the left compartment 18 thereof; to this end there is provided a flexible conduit 20 interconnecting the clutch motor with the intake manifold 22 of the internal combustion engine 24 of the vehicle, and there is interposed in said conduit a valve unit 26 constituting the present invention, and which unit serves to completely control the operation of the motor.

As is well-known to those skilled in this art, there exists in the manifold 22 a vacuum of some twenty inches of mercury when the engine throttle 28 is closed and the engine pistons are functioning as miniature pumps. A three-way clutch motor control valve member, operating as a part of the valve unit 26, may be operated to place the clutch motor 12 in circuit with the manifold when the throttle is closed to either free wheel or shift gears, thereby evacuating the left compartment of the clutch motor and disengaging the clutch, as disclosed in Figure 1. A check valve 29 in the clutch motor is automatically operated to admit the atmosphere to effect this power stroke of the motor. When it is desired to reengage the clutch, the aforementioned three-way control valve is again operated to vent the clutch motor, all as will be more completely brought out in the detailed description to follow.

Passing now to a more complete description of the structure and operation of the valve unit forming the subject matter of the present invention, the same preferably comprises a one-piece casing member 30, preferably secured to the engine casing by brackets 32. The casing is provided with ports 34 and 36 adapted to receive the disconnected portions of the conduit 20, and is also provided with a port 38 connected with the right compartment 40 of the motor 12 by means of a flexible conduit 42. The casing is adapted to receive a reciprocable sleeve valve cut off member 44 provided with a slot 46 and also provided with aligned openings 48 and 50 adapted to register with the casing ports 34 and 36, respectively. The cut off valve member 44 is preferably operated by means of a Bowden wire control operable from the dash, the conduit 52 of the control being secured at its ends to the dash and to a boss 54 on the casing member 30, and the cable of the control being secured at its outer end to a boss 56 extending from a plug 58 mounted in the end of the sleeve. The valve unit is completed by a reciprocable combined three-way and bleed valve plunger member 60 operable by a link 62 connected to a throttle rod 64 actuated by an accelerator pedal 66. The plunger 60 is provided at its end with a reduced portion 68 and is further provided with tapered and uniform vent slots 72 and 70, respectively, preferably angularly spaced approximately ninety degrees apart in the body of the plunger.

Figure 2:
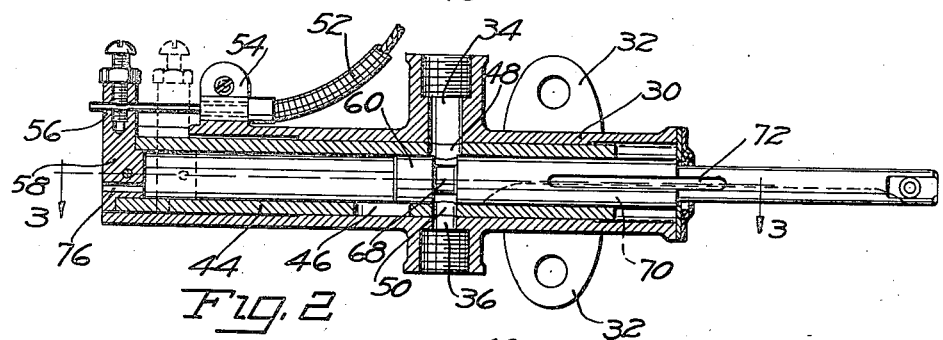
Figure 2 is a longitudinal sectional view of the valve unit constituting the invention.

Describing now the operation of the clutch control mechanism, release of the accelerator pedal 66 serves to first permit a closing of the throttle 28 by virtue of a lost motion connection at 74, and then effect a movement of the plunger 60 to the right to the position disclosed in Figure 2 to register the recessed end of the plunger with the registered openings in the sleeve 44 and casing 30. The clutch motor is thus placed in circuit with the idling engine motor to energize the former and disengage the clutch.

Figure 3:
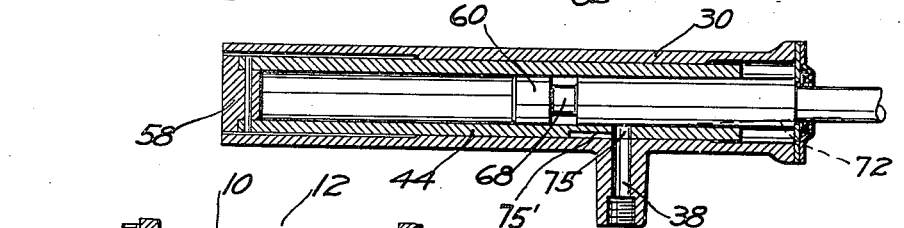
Figure 3 is another sectional view of the valve unit, the section being taken on line 3—3 of Figure 2.
Figure 4:
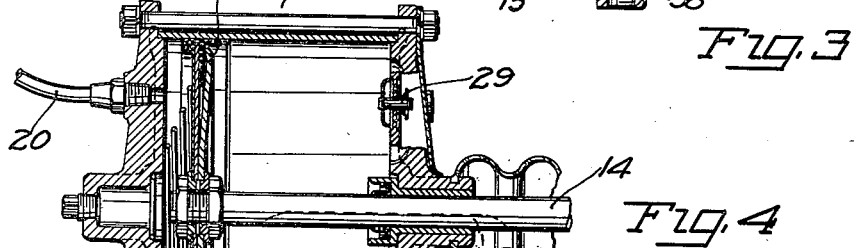
Figure 4 is a longitudinal sectional view of the clutch operating motor unit, the operation of which is controlled by the aforementioned valve unit.

When it is desired to reengage the clutch, i. e. after an operation of the change speed transmission, the accelerator 66 is depressed, moving the plunger 60 to the left, cutting off communication with the manifold and registering the atmospheric slot 70 with registered openings 36 and 50 to thereby vent the left compartment 18 of the clutch motor. The tapered vent or atmospheric slot 72 in the plunger is, with this operation, also registered with the port 38 in the casing 30, Figure 3, to permit a regulated efflux of air from the right compartment 40 of the motor as the clutch is engaged under the action of its spring.

The rate of movement of the driving clutch plate is thus predetermined by the degree of depression of the accelerator which, by virtue of the positive connection between the plunger 60 and the throttle link 64, determines the position of the plunger and consequently the depth of taper of the slot 72 which is registered with the port 38. The rate of movement of the clutch plate is relatively high during the first part of its throw due to the relatively rapid efflux of air via the atmospheric slot 15 in the motor connecting rod 14. The last stage of clutch plate movement is, however, relatively slow for at this time all of the air forced from the clutch motor compartment 40 is passed through the conduit 42 and through the regulated port 38.

With a slight opening of the throttle, for example, in starting the car with the transmission being set in either low or reverse gears, there is a corresponding relatively slow engagement of the clutch due to the relatively shallow depth of the tapered slot 72 exposed to the port 38. This permits a relatively slow or slipping clutch engagement in starting the car, which is the end desired. With the transmission in either intermediate or high gears, during the stepping up of the vehicular speed, the throttle is usually opened to a greater extent and the clutch is accordingly engaged more rapidly due to the increased rate of air bleed from the clutch motor. With the suggested construction, if the throttle is opened rather wide, either voluntarily or involuntarily, the clutch is engaged before the motor can be stepped up to a racing speed. If a high racing speed is reached before the clutch plates engage, a rapid wearing of the friction surfaces ensues, which effect is, of course, highly undesirable.

It will be appreciated from the aforementioned description that the plunger 60 thus serves both as a three-way control valve member to initiate the disengaging and engaging operations of the clutch motor and as a bleed valve member to control the mode of clutch engagement.

The cut off sleeve valve member 44 is, during the above described operations, positioned to register the openings 48 and 50 with the ports 34 and 36 in the casing and an opening 75 in the sleeve is registered with the port 38 in the casing, thereby permitting the power operation of the clutch. When it is desired, however, to dispense with the power clutch control, i. e. to cut out the free wheeling operation of the vehicle, the driver operates the Bowden control from the dash to thereby move the cut off sleeve valve member 44 to the right, Figure 2, cutting off communication with the manifold and rendering the plunger valve member 60 inoperative. The motor 12 is, with the cut off operation, vented to the atmosphere via conduit 20, port 36, slot 46 and a slot 70 in the plunger 60 and via conduit 42, port 38, an undercut portion 75' in the sleeve member 44, port 75 and slot 72 to thus insure a subsequent unimpeded manual operation of the clutch pedal 16.

There is thus provided a very compact and effective control valve providing, in one unit, all of the selective operations of the valve necessary to the efficient control of a vacuum operated clutch operating mechanism.

While one illustrative embodiment has been described, it is not my intention to limit the scope of the invention to that particular embodiment, or otherwise than by the terms of the appended claims.

I claim:

1. In a clutch control mechanism for an automotive vehicle provided with a clutch, an accelerator and an instrument board, a valve unit for controlling the operation of said mechanism including a casing member and a plurality of telescoping reciprocable valve members mounted for sliding movement within said casing, and separate, individually operated manually operable means for operating each of said reciprocable valve members, one of said manually operable means being operated from the instrument board of the automotive vehicle and the other of said means being operated by the accelerator pedal of the vehicle.

2. In a power clutch control mechanism for an automotive vehicle, a single control valve unit comprising a casing member and relatively movable telescoping cut off, three-way and bleed valve members mounted for reciprocable operative movement within said casing, said three-way and bleed valve members being integrally connected and constituting in effect one unitary member.

3. In a power clutch control mechanism for an automotive vehicle, a single control valve unit comprising a casing member and relatively movable telescoping cut off, three-way and bleed valve members mounted for reciprocable operative movement within said casing, one of said valve members being constructed to function both as the three-way control valve element and as the bleed valve element and the other of said relatively movable telescoping members functioning as a cut off valve element to selectively render the clutch control mechanism either operative or inoperative at the will of the driver.

4. In a power clutch control mechanism for an automotive vehicle, a single control valve unit comprising a casing member and relatively movable telescoping cut off, three-way and bleed valve members mounted for reciprocable operative movement within said casing, one of said valve members being constructed to function both as the three-way control valve element and as the bleed valve element and the other of said movable telescoping members functioning as a cut off valve element to selectively render the clutch control mechanism either operative or inoperative at the will of the driver, and means for selectively operating said valve members comprising individually operated manually operable control means.

5. A valve unit for a vacuum operated clutch controlling motor comprising a cylindrical casing member provided with inlet, outlet and bleed ports therein, a sleeve valve member mounted within said casing for reciprocable movement therein, said sleeve member being also provided with inlet, outlet and bleed ports adapted to register with the corresponding ports in the casing member, and a third plunger valve member mounted for reciprocable movement within said sleeve member.

6. A valve unit for a vacuum operated clutch controlling motor comprising a cylindrical casing member provided with inlet, outlet and bleed ports therein, a sleeve valve member mounted within said casing for reciprocable movement therein, said sleeve member being also provided with inlet, outlet and bleed ports adapted to register with the corresponding ports in the casing, and a third plunger valve member mounted for reciprocable movement within said sleeve member, said plunger member being provided with recessed and slotted portions adapted to selectively register with the inlet and outlet ports of the casing and sleeve member, and further provided with a second slotted portion adapted to register with the bleed ports of the casing and sleeve member.

7. In a power operated clutch control mechanism for an automotive vehicle, a control valve unit comprising a casing member provided with inlet, outlet and bleed ports therein, a reciprocable combination three-way and bleed valve member constructed to cooperate with said ports and housed within said casing, together with means reciprocable within said casing for rendering said valve member inoperative for the purpose intended.

8. In a power operated clutch control mechanism for an automotive vehicle, a control valve unit for said mechanism comprising a casing member having inlet, outlet and bleed ports, a valve member reciprocable within said casing member and provided with inlet and outlet ports and with an atmospheric vent port, the inlet and outlet ports of said valve member being registrable with the corresponding aforementioned ports in one position of said valve member and moved out of registration therewith in another position of said valve member, together with a second valve member reciprocable within said first mentioned valve member and selectively operable to either interconnect said aforementioned inlet and outlet ports or interconnect said inlet and bleed ports with the atmosphere.

9. Power operated clutch control mechanism for an automotive vehicle comprising a pressure differential operated motor, a valve unit for controlling the gaseous pressure within said motor to control both the engagement and the disengagement of the clutch, said unit comprising a reciprocable valve member telescopingly mounted therein and selectively operable either to permit of a normal operation of said unit to control the operation of said motor or to render said unit inoperative for the purpose intended by permanently venting said motor to the atmosphere.

10. In a power operated clutch control mechanism for an automotive vehicle, a control valve unit for said mechanism comprising a casing member having inlet, outlet and bleed ports, a valve member reciprocable within said casing member and provided with inlet and outlet ports and with an atmospheric vent port, the inlet and outlet ports of said valve member being registrable with the corresponding aforementioned ports in one position of said valve member and moved out of registration therewith in another position of said valve member, together with a second valve member reciprocable within said first mentioned valve member and selectively operable to either interconnect said aforementioned inlet and outlet ports or interconnect said inlet and bleed ports with the atmosphere, and independent manually operable means for selectively operating either of said valve members.

CARL H. WOLCOTT.